Patented May 9, 1933

1,908,319

UNITED STATES PATENT OFFICE

PAUL JOHNSON CARLISLE AND CHARLES DANGELMAJER, OF NIAGARA FALLS, NEW YORK, ASSIGNORS, BY MESNE ASSIGNMENTS, TO THE ROESSLER & HASSLACHER CHEMICAL COMPANY, OF NEW YORK, N. Y., A CORPORATION OF DELAWARE

EVOLUTION OF HYDROCYANIC ACID FROM CALCIUM CYANIDE

No Drawing. Application filed October 15, 1928. Serial No. 312,734.

This invention relates to cyanogen compounds of calcium which furnish for certain purposes a very convenient source of gaseous hydrocyanic acid. These substances may be used for fumigation by introducing them into the space to be fumigated in the form of finely divided powders which, on contact with the moisture in the air, hydrolyze and evolve hydrocyanic acid.

Cyanogen compounds of calcium prepared according to different methods have different characteristic rates at which they evolve hydrocyanic acid on exposure to moist air.

The object of this invention is to provide a means for accelerating the rate of HCN evolution from those cyanogen compounds of calcium which have relatively slow rates of HCN evolution when exposed to the atmosphere.

We have discovered that the rate of HCN evolution from calcium cyanide compounds having normally relatively slow rates of hydrolysis can be greatly accelerated if anhydrous ammonium cyanide in finely divided form is present. The same result can be secured by using substances which will form ammonium cyanide in situ. For example, the cyanogen compound can be treated with a small amount of hydrocyanic acid and a small amount of anhydrous ammonia which of course form ammonium cyanide. Upon agitation, the latter is incorporated thoroughly into the body of the product. Care should be exercised to introduce no excess ammonia since this may result in polymerization and undesirable darkening of the product. Preferably, the hydrocyanic acid and ammonia should be added in quantities chemically equivalent to each other.

Comparative tests on the rates of HCN evolution of four different products were made. We shall describe these products briefly and assign to them the letters A, B, C, D.

*Product A.*—This product is made by reaction between commercial burnt lime and hydrocyanic acid in a liquid HCN medium containing about 2 per cent of water to accelerate the reaction. This product usually contains cyanogen equivalent to about 42–44% by weight of $Ca(CN)_2$.

*Product B.*—This product is made by reaction between commercial burnt lime and hydrocyanic acid in ethyl ether medium containing water and ammonia (about 3% and 1% respectively) to accelerate the reaction. This product usually contains cyanogen equivalent to 44–48% by weight of $Ca(CN)_2$.

*Product C.*—This product consisted of product A to which had been added some anhydrous hydrocyanic acid and anhydrous ammonia. In preparing this product approximately 100 grams of product A was placed in a bottle and anhydrous HCN and anhydrous ammonia were added in such amounts that the product contained the equivalent of 23.5% by weight HCN, of which 88.1% was calcium cyanide and 11.9% was ammonium cyanide.

*Product D.*—This product consisted of product B, to which was added some solid ammonium cyanide. In preparing product D, 43 grams of product B was placed in a glass bottle and 1.14 grams of pure solid ammonium cyanide was added. The mixture was shaken vigorously and analyzed for HCN content, which was found to be 27.2% by weight HCN, of which 5.8% was present as ammonium cyanide and 94.2% as calcium cyanide.

The method used in determining the rate of HCN evolution from these products was as follows:

Four portions of each product consisting of 12–15 grams of the material were weighed out and each portion was spread out in a thin layer on a sheet of paper. These four portions were placed near each other in the same room, so that they were subjected to the same temperature and humidity conditions.

At the end of each 15 minute interval one portion was recovered and the entire portion subjected to analysis for HCN.

The following table shows the results of these tests:

*Per cent of total HCN evolved*

| Exposure time (minutes) | A | B | C | D |
|---|---|---|---|---|
| | Percent | Percent | Percent | Percent |
| 15 | 0.2 | 7.9 | 22.0 | 23.7 |
| 30 | 3.6 | 11.0 | 46.3 | 46.5 |
| 45 | 11.0 | 16.5 | 58.7 | 51.2 |
| 60 | 15.5 | 25.2 | 64.9 | 66.9 |

The above table shows clearly the great accelerating effect of the ammonium cyanide on the rate of HCN evolution regardless of whether it is added as such or whether it is formed in the product to be treated.

Columns C and D show clearly that the addition of HCN and ammonia in the one case and solid ammonium cyanide in the other greatly accelerated the rate of HCN evolution of products A and B.

We claim:

1. In the process for making a calcium cyanide product the step which comprises incorporating with said product sufficient anhydrous ammonium cyanide to appreciably accelerate the evolution of HCN on exposure of said product to the atmosphere.

2. A product comprising a pulverulent calcium cyanide having admixed therewith anhydrous ammonium cyanide to appreciably accelerate the evolution of HCN on exposure of said product to the atmosphere.

3. Method of fumigating with a calcium cyanide containing product which comprises exposing said product admixed with sufficient ammonium cyanide to appreciably accelerate the evolution of HCN upon exposure of said product to the atmosphere within the space to be treated.

Signed at Niagara Falls, in the county of Niagara and State of New York this 8th day of October A. D. 1928.

PAUL JOHNSON CARLISLE.
CHARLES DANGELMAJER.

CERTIFICATE OF CORRECTION.

Patent No. 1,908,319.  May 9, 1933.

PAUL JOHNSON CARLISLE, ET AL.

It is hereby certified that error appears in the printed specification of the above numbered patent requiring correction as follows: Page 2, line 32, claim 2, after "therewith" insert the word "sufficient"; and that the said Letters Patent should be read with this correction therein that the same may conform to the record of the case in the Patent Office.

Signed and sealed this 11th day of July, A. D. 1933.

M. J. Moore.

(Seal) Acting Commissioner of Patents.